United States Patent
Jung

(10) Patent No.: US 7,277,949 B2
(45) Date of Patent: Oct. 2, 2007

(54) METHOD FOR CONTROLLING OPERATION OF MOBILE TERMINAL HAVING MULTIMEDIA DATA SERVICE CAPABILITY

(75) Inventor: Sang Il Jung, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 1176 days.

(21) Appl. No.: 10/013,726

(22) Filed: Dec. 13, 2001

(65) Prior Publication Data

US 2002/0097846 A1     Jul. 25, 2002

(30) Foreign Application Priority Data

Dec. 19, 2000     (KR)     ................ 2000-78152

(51) Int. Cl.
    G06F 13/00     (2006.01)
(52) U.S. Cl. .............. 709/227; 709/219; 709/237; 725/62
(58) Field of Classification Search .......... 709/217, 709/219, 227, 231, 237
    See application file for complete search history.

(56) References Cited

U.S. PATENT DOCUMENTS

| | | | | |
|---|---|---|---|---|
| 5,822,524 A | * | 10/1998 | Chen et al. | 709/203 |
| 6,038,439 A | * | 3/2000 | Rune | 455/406 |
| 6,081,278 A | * | 6/2000 | Chen | 345/473 |
| 6,314,466 B1 | * | 11/2001 | Agarwal et al. | 709/231 |
| 6,431,133 B2 | * | 8/2002 | Brandl et al. | 123/90.31 |
| 6,535,743 B1 | * | 3/2003 | Kennedy et al. | 455/456.1 |
| 6,625,655 B2 | * | 9/2003 | Goldhor et al. | 709/231 |
| 6,687,743 B1 | * | 2/2004 | Innes | 709/206 |
| 6,728,763 B1 | * | 4/2004 | Chen | 709/219 |
| 6,959,448 B1 | * | 10/2005 | Seo | 725/87 |
| 2003/0018581 A1 | * | 1/2003 | Bratton et al. | 705/50 |

* cited by examiner

*Primary Examiner*—Viet D. Vu
(74) *Attorney, Agent, or Firm*—KED & Associates, LLP

(57) ABSTRACT

A method of controlling the operation of a mobile terminal having a multimedia data service capability is disclosed. The method initially includes establishing a call connection to a base station if a multimedia data service request is made by a mobile terminal user to receive multimedia data. Upon establishing the call connection, the mobile terminal sends a multimedia data service request signal to a base station and receives the corresponding multimedia data for a first pre-determined period of time. Then, it disconnects the call connection and stops providing electric power to a signal receiving/transmitting part of the terminal after receiving a confirmation signal responding to the play-back period it has calculated earlier. Finally, it plays-back the received data for the play-back period. By using the present invention, an unnecessary connection fee can be eliminated, and the power being supplied to the mobile terminal while playing-back the data can be efficiently saved.

7 Claims, 3 Drawing Sheets

METHOD FOR CONTROLLING OPERATION OF MOBILE TERMINAL HAVING MULTIMEDIA DATA SERVICE CAPABILITY

BACKGROUND OF THE INVENTION

1. Field of the Invention

The present invention relates to a mobile terminal having a multimedia data service function, and more particularly, to a method of controlling the operation of a mobile terminal having a multimedia data service capability. The method according to the present invention can significantly reduce power consumption of the mobile terminal and the communication cost when using a multimedia data service such as a Video-on-Demand (VOD) service.

2. Background of the Related Art

A Video-on Demand (VOD) service can provide multimedia data such as motion picture data to many users widely dispersed at same time. The VOD service technique can be applied to many interactive multimedia data service fields such as Movies-on-Demand service, interactive video games, news, advertisements, product catalog search, remote education, video conference, digital library, and multimedia intranet services and more.

FIG. 1 is a block diagram of a code division multiple access (CDMA) mobile terminal having a VOD service function according to the related art. According to FIG. 1, the mobile terminal includes a duplexer 150 for receiving/transmitting signals through an antenna (ANT), a signal transmitting/receiving (T/R) part 100 for transmitting/receiving signals to/from a base station, a signal processing part 300 for performing necessary processes on the incoming or outgoing signals, a memory part 400 for storing the signals processed in the signal processing part 300, a data generator 200 for generating sound/image signals from the signals processed in the signal processing part 300 and playing-back the sound/image signals through a display unit 250 and a speaker 220, and a power supply 500 for providing power (electricity) to the signal T/R part 100 or signal processing part 300.

In addition, the signal T/R part 100 of the mobile terminal includes a baseband transmitter 110 for generating baseband signals based on the signals received from the signal processing part 300, a radio frequency (RF) transmitter 120 for transmitting the baseband signals to an outside receiving system through the duplexer 150, a radio frequency (RF) receiver 130 for receiving the RF signals from an outside transmitting system through the duplexer 150, and a baseband receiver 140 for processing the RF signals received from the RF receiver 130 and sending the processed signals to the signal processing part 300.

Moreover, the data generator 200 includes a voice Coder-Decoder (CODEC) 210 for coding the analog voice signals and decoding digital voice signals processed from the signal processing part 300, a speaker 220 for generating sound based on the sound signals decoded in the CODEC 210, a microphone 230 for receiving the voice signals of a telephone user, an image CODEC 240 for decoding the image signals processed in the signal processing part 300, and a liquid crystal display (LCD) 250 for displaying the image signals decoded in the image CODEC 240.

Reference will now be made in detail to the CDMA mobile terminal having a VOD service function according to the related art. When the power of the mobile terminal is on initially, the signal processing part 300 controls the power supply 500 in order to provide necessary power to the signal processing part 300 and the signal T/R part 100 of the mobile terminal. The antenna (ANT) receives the RF signals from a base station and transmits the received signals to the signal T/R part 100 through the duplexer 150. The RF receiver 130 then receives the RF signals and sends the signals to the baseband receiver 140 to generate baseband signals. When the signal processing part 300 receives the baseband signals, the status of the mobile terminal turns to a paging state. In other words, the mobile terminal becomes aware of the fact that the VOD signals are being received.

Next, the signal processing part 300 sends the status information of the mobile terminal including an ESN (electrical serial number) and others to the base station. When the base station registers the mobile terminal (MT), the status of the MT turns to a standby state, and it checks whether there was a VOD service request made by a telephone user. This is done by checking whether the user switched the status of the MT to a traffic state by pressing down the prescribed telephone keys. If there was a request made by the user, the signal processing part 300 then sends a VOD service request signal to the base station and receives corresponding VOD data through the signal T/R part 100.

Next, the signal processing part 300 performs the required processes on the VOD data received. The voice CODEC 220 decodes the voice signals and outputs them through a speaker 220, and the image CODEC 240 decodes the image signals and displays them on the LCD 250. Finally, when the signal processing part 300 receives all the VOD data, it terminates the line connection and the VOD service.

The problems due to limitations and disadvantages of the CDMA mobile terminal having a VOD service function according to the related art are as follows. First, the status of the mobile terminal remains unchanged while it receives and plays-back the VOD data. Therefore, the user will be responsible to pay the communication charges even after the data transmission is completed. It also means that the power will still be provided to each element of the signal T/R part (110, 120, 130, and 140) during such period of time. Therefore, it shortens the battery life of the mobile terminal.

SUMMARY OF THE INVENTION

Accordingly, the present invention is directed to a method for controlling the operation of a mobile terminal having a data service capability that substantially obviates one or more problems due to limitations and disadvantages of the related art.

An object of the present invention is to provide a method of for controlling the operation of a mobile terminal having a multimedia data service that can significantly reduce power consumption and the telephonic communication cost when using such service by disconnecting the call connection and by cutting off the power supply during data generation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling the operation of a mobile terminal having a multimedia data service capability includes establishing a call connection to a base station if a data service request is made by a mobile terminal user to receive multimedia data; sending a data service request signal to a base station; receiving the multimedia data from the base station for a first given period; calculating a play-back period required for playing-back the received data and sending an information signal including the calculated play-back period to the base station; receiving a confirmation signal responding to the sent information signal from the base station; and playing-back the received multimedia data for the play-back period.

In addition, the method further includes checking whether the received data includes a terminating signal after the disconnecting step; providing the electric power to the signal receiving/transmitting part of the mobile terminal if the received data does not include the terminating signal; reestablishing the call connection; and repeating the steps from the data service request sending step to the playing-back step until the received data includes the terminating signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
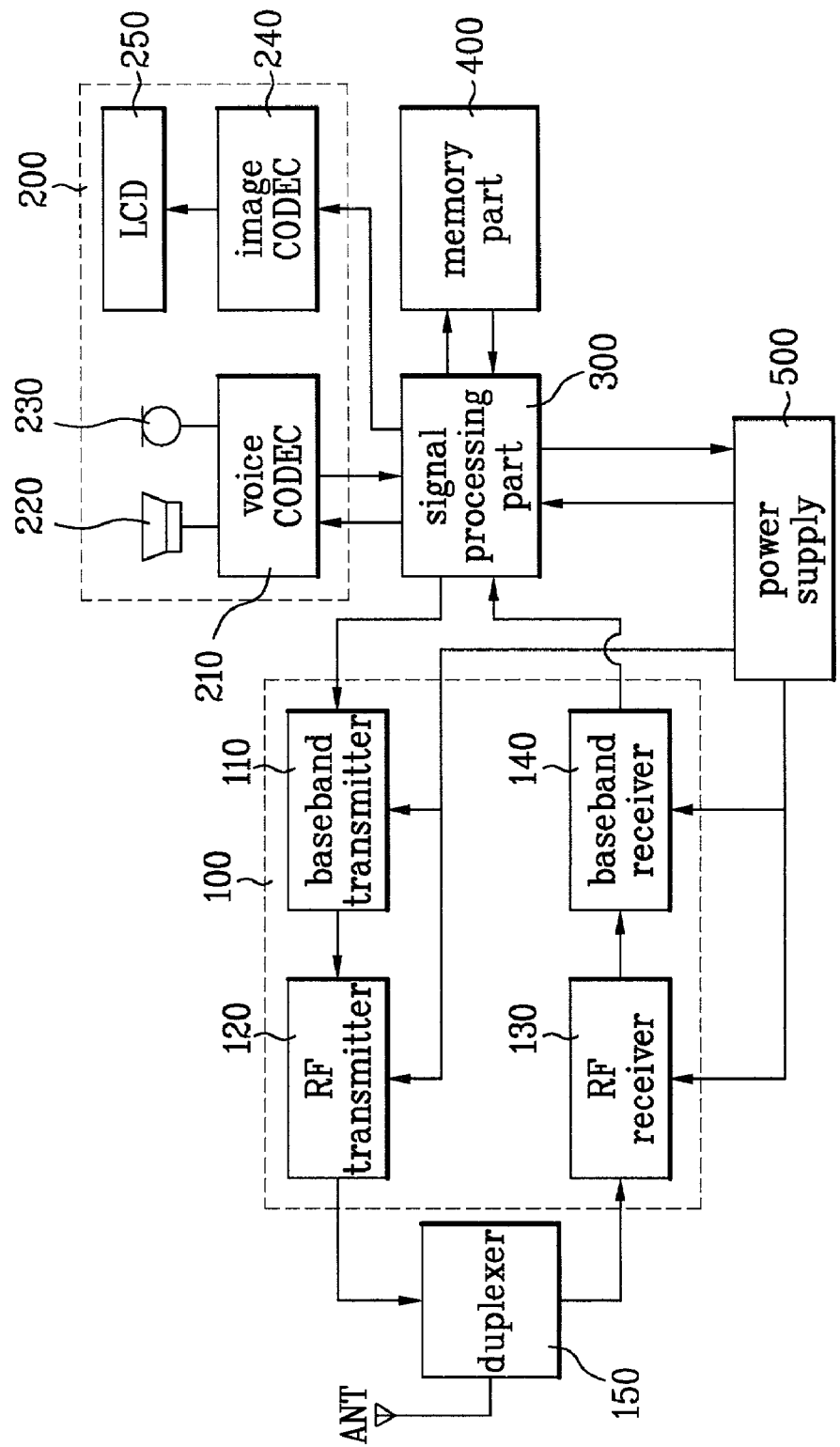
FIG. 1 is a block diagram illustrating a CDMA mobile terminal having a VOD service capability according to the related art.
Figure 2:
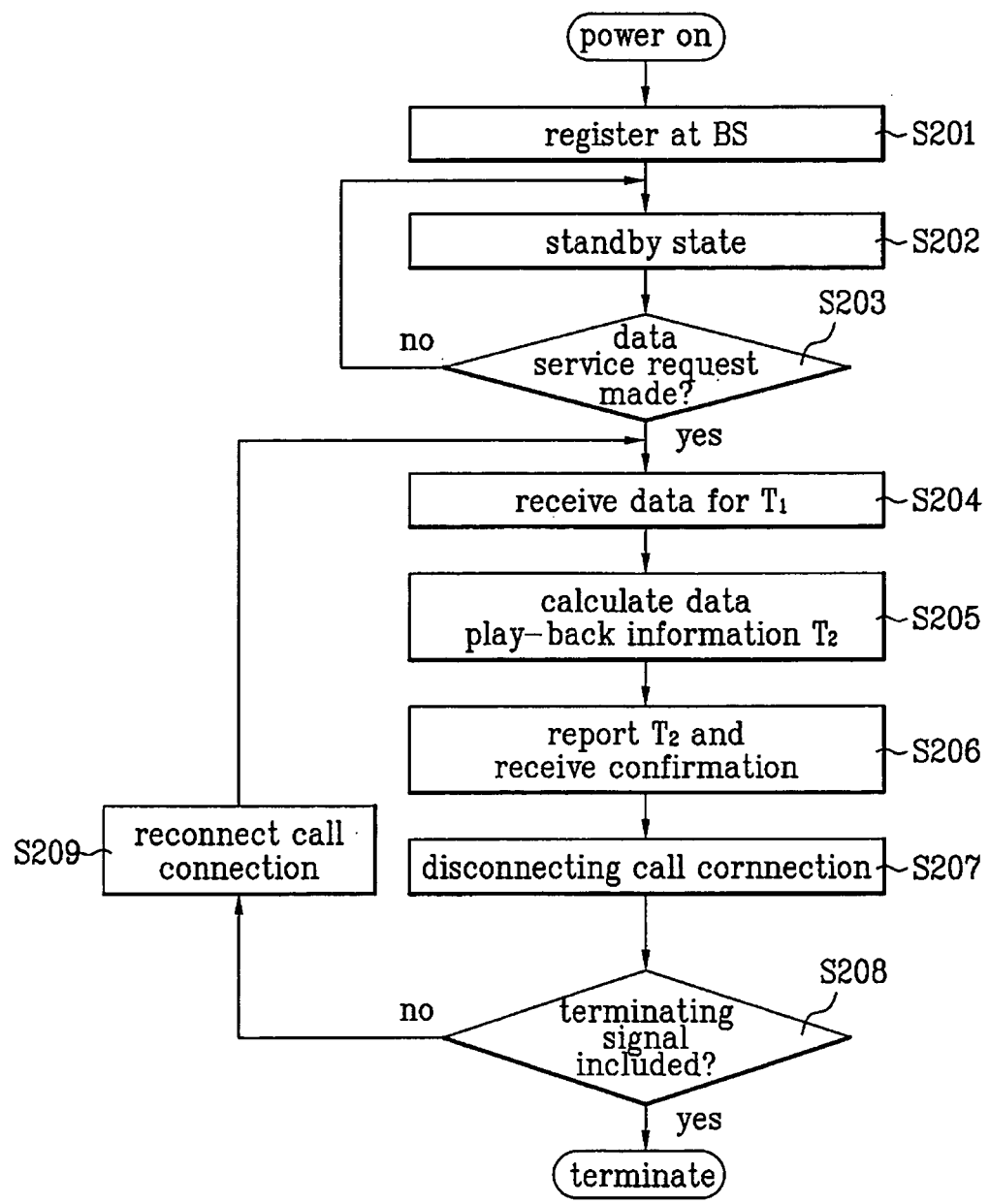
FIG. 2 is a flow chart illustrating a method of controlling the operation of a mobile terminal having a multimedia data service capability according to the present invention.
Figure 3:
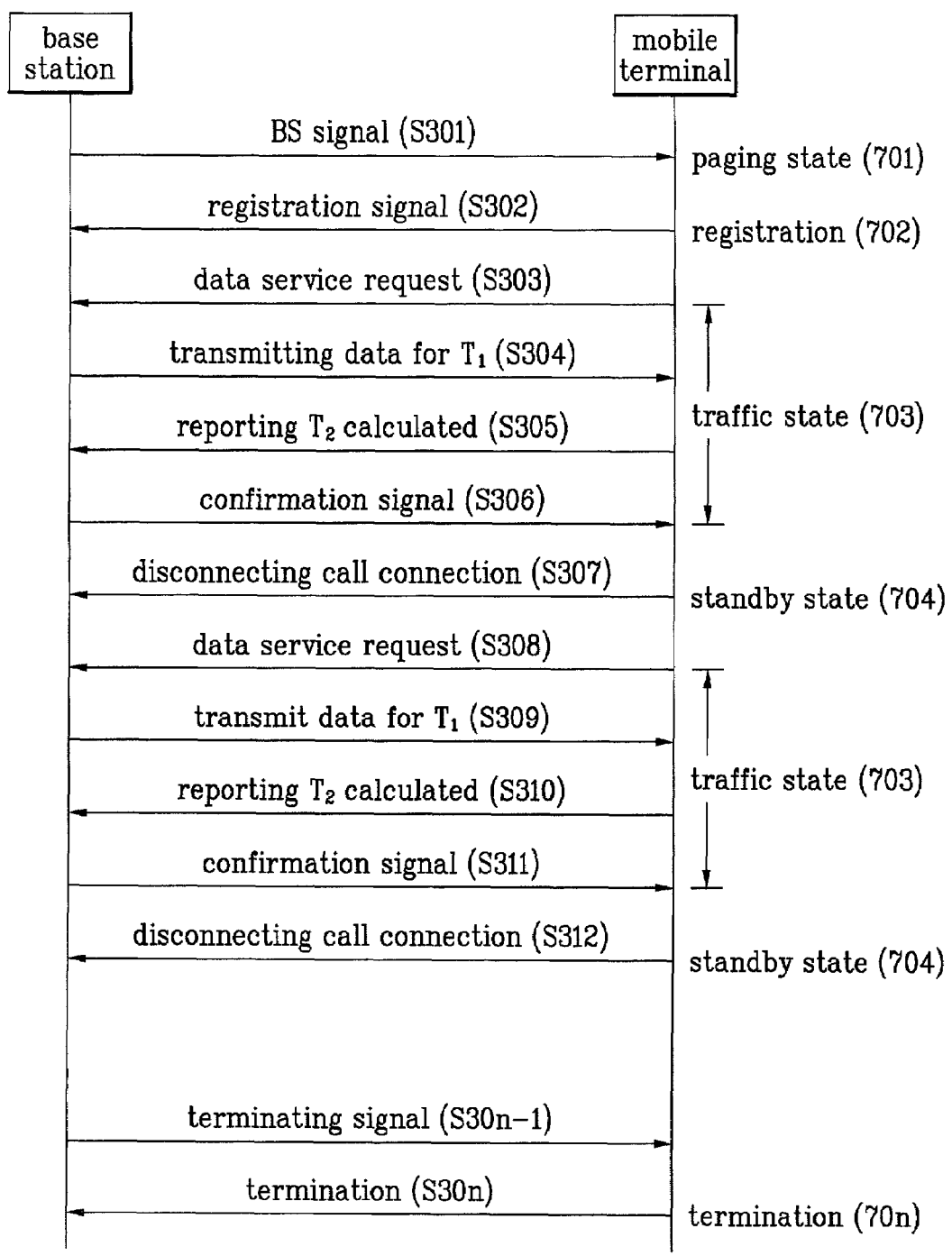
FIG. 3 is a flow chart illustrating a signal flow between a base station and a mobile terminal in a mobile communication system having a multimedia data service function according to the present invention.

FIG. 2 is a flow chart illustrating a method of controlling the operation of a mobile terminal having a multimedia data service function. In addition, FIG. 3 is another flow chart illustrating a signal flow between a base station and a mobile terminal in a mobile communication system having a multimedia data service function according to the present invention. The base station transmits multimedia data received from a server providing multimedia data to the mobile terminal. Therefore, we name base station instead of a multimedia data service provider hereinafter. According to both figures, when the power of a mobile terminal (MT) is on, the signal processing part 300 controls the power supply 500 to provide necessary electricity to each part of the MT. The signal processing part 300 then registers at the base station by sending its status information (S201), and next, the status of the MT turns to a standby state (S202).

In order to be registered, the MT initially receives a base station signal from the base station (S301). After the signal T/R part 100 inputs the BS signal received through the antenna and duplexer 150 to the signal processing part 300, the status of the MT turns to a paging state 701. Finally, the MT registers at the BS 702 by sending a registration signal including its status information to the BS through the baseband transmitter 110, the RF transmitter 120, and the duplexer 150 (S302).

Next, the signal processing part 300 checks whether a VOD service request is made by a MT user (S203). If it is, the MT sends a VOD data transmission request signal to the BS (S303) after being connecting to a corresponding VOD server by pressing down the prescribed telephone keys for the request 703. Then the BS sends corresponding VOD data to the MT for a first given period of time S304. In other words, the MT receives the data from the BS for the first given period of time (T1) (S204). The data received through the antenna and the duplexer 150 become the RF signals after being processed in the RF receiver 130 and are inputted to the signal processing part 300 after passing through the baseband receiver 140. Then the signal processing part 300 stores the baseband signals in the memory part 400 after performing required processes.

The signal processing part 300 calculates a play-back period (T2) necessary for playing-back the data received by using the total amount of the data received during T1 and a data play-back rate (bps) of the mobile terminal (S205). The MT reports the calculated T2 information to the BS (S305) and receives a corresponding confirmation signal from the BS (S206 and S306). When the system starts to play-back the data received during T1, the signal processing part 300 disconnects the call connection (S207 and S307), and the status of the MT turns to a standby state 704.

During T2, the signal processing part 300 first reads the data stored in the memory part 400 and outputs them to the data generator 200. The data generator 200 then decodes the voice signals in the voice CODEC 210 to generate sound through the speaker 220 and decodes the image signals in the image CODEC 240 for displaying images on the LCD 250.

After disconnecting the call, the signal processing part 300 checks whether a terminating signal is included in the data received during T1 (S208). If it is not, the MT resends a VOD data transmission request signal to the base station during T3 when T2-T3 elapses (S308), where T3 represents a period of time required for a new call connection. Therefore, the new call connection should be established when the playing-back step is completed. In order to resend the VOD data transmission request signal, the signal processing part 300 makes a new connection call to the BS S209 through the signal T/R part 100. Subsequently, the status of the MT turns to a traffic state.

As shown in FIG. 2, the steps from S204 to S209 will be repeated until the data received during T1 includes a VOD service-terminating signal in the step S209. If the signal processing part 300 determines that the termination signal is finally included in S208, it terminates the communication by sending a termination signal to the BS.

In conclusion, the method for controlling the operation of a mobile terminal in a mobile communication system according to the present invention can reduce power consumption and the communication cost when using a multimedia data service (i.e., VOD service) by connecting to the base station only when the corresponding data are being received. It disconnects the call connection made earlier when all the received data are being played-back.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of controlling the operation of a mobile terminal having a multimedia data service capability, the method comprising:
   establishing a call connection to a server if a data service request is made by a mobile terminal user to receive multimedia data;
   sending a data service request signal to the server;
   receiving said multimedia data from said server for a first given period;
   calculating a play-back information required for playing-back said received multimedia data and sending an information signal including said calculated play-back information to said server, said play-back information required for play-back said received data being calculated based on an amount of said received data and a data processing rate of said mobile terminal;
   receiving a confirmation signal responding to said sent information signal from said server; and
   playing-back said received multimedia data for said play-back information.

2. The method of claim 1, further comprising:
   disconnecting said call connection;
   checking whether said received multimedia data includes a terminating signal upon completion of disconnecting; and
   terminating a multimedia data service if said received data includes said terminating signal.

3. The method of claim 1, further comprising:
   disconnecting said call connection;
   checking whether said received multimedia data includes a terminating signal upon completion of disconnecting;
   reestablishing said call connection; and
   repeating the steps of sending a data service request signal to the server, receiving said multimedia data from said server for a first given period, calculating a play-back information required for playing-back said received multimedia data and sending an information signal including said calculated play-back information to said server, said play-back information required for playing-back said received data being calculated based on an amount of said received data and a data processing rate of said mobile terminal, receiving a confirmation signal responding to said sent information signal from said server; and playing-back said received multimedia data for said play-back information, until said received data includes said terminating signal.

4. The method of claim 1, further comprising:
   providing electric power to said mobile terminal before said call connection is established;
   receiving a server signal from said server; and
   registering at said server by sending a registration signal to said server.

5. The method of claim 1, wherein said mobile terminal user makes said data service request by pressing down one or more prescribed mobile terminal keys or buttons.

6. The method of claim 1, wherein said received data are initially stored in a memory of said mobile terminal.

7. The method of claim 1, wherein the playing-back said received multimedia data comprises:
   storing said received multimedia data in a memory of said mobile terminal;
   decoding said stored multimedia data to generate voice signals and image signals; and
   generating corresponding sound and images to said mobile terminal user using said voice signals and image signals.

* * * * *